(12) United States Patent
Schuette et al.

(10) Patent No.: US 12,281,406 B2
(45) Date of Patent: Apr. 22, 2025

(54) CERAMIC COATED IRON PARTICLES AND METHODS FOR MAKING CERAMIC COATED PARTICLES

(71) Applicant: THE BOEING COMPANY, Arlington, VA (US)

(72) Inventors: Waynie M. Schuette, Troy, IL (US); Patrick J. Kinlen, Fenton, MO (US)

(73) Assignee: The Boeing Company, Arlington, VA (US)

(*) Notice: Subject to any disclaimer, the term of this patent is extended or adjusted under 35 U.S.C. 154(b) by 118 days.

(21) Appl. No.: 18/126,202

(22) Filed: Mar. 24, 2023

(65) Prior Publication Data

US 2023/0235473 A1 Jul. 27, 2023

Related U.S. Application Data

(62) Division of application No. 16/676,509, filed on Nov. 7, 2019, now Pat. No. 11,613,624.

(51) Int. Cl.
*C23C 18/16* (2006.01)
*B22F 1/05* (2022.01)
(Continued)

(52) U.S. Cl.
CPC ............... *C25D 9/06* (2013.01); *B22F 1/05* (2022.01); *B22F 1/102* (2022.01); *B22F 1/16* (2022.01);
(Continued)

(58) Field of Classification Search
CPC .................................. C08K 9/02; C08K 3/08
See application file for complete search history.

(56) References Cited

U.S. PATENT DOCUMENTS 2,766,201 A 10/1956 Luther
4,305,792 A * 12/1981 Kedward ............... C25D 15/02
427/180

(Continued)

FOREIGN PATENT DOCUMENTS

CN 1272122 A 11/2000
CN 102321907 A 1/2012
(Continued)

OTHER PUBLICATIONS

European Patent Office, Communication pursuant to Article 94(3) EPC for Application 20 203 670.3-1103 dated Jun. 23, 2023.
(Continued)

*Primary Examiner* — Dah-Wei D. Yuan
*Assistant Examiner* — Kristen A Dagenais
(74) *Attorney, Agent, or Firm* — Walters & Wasylyna LLC (57) ABSTRACT

The present disclosure provides a coated iron particle, or reaction product of a coating and the iron particle, comprising an iron particle and a ceramic coating disposed on the iron particle. Aspects of the present disclosure provide a coated iron particle, or reaction product of a coating and the iron particle, including an iron particle having a diameter of from about 0.5 micron to about 100 microns; and a ceramic coating disposed on the iron particle. Aspects of the present disclosure further provide compositions comprising a coated iron particle and a polymer or adhesion promoter. Aspects of the present disclosure further provide components, such as components, such as vehicle components, having a surface and a composition of the present disclosure disposed on the surface.

20 Claims, 2 Drawing Sheets

(51) Int. Cl.
  *B22F 1/102* (2022.01)
  *B22F 1/16* (2022.01)
  *C08K 3/08* (2006.01)
  *C08K 9/02* (2006.01)
  *C25D 9/06* (2006.01)
  *H01F 1/09* (2006.01)

(52) U.S. Cl.
  CPC ............ *C08K 3/08* (2013.01); *C08K 9/02* (2013.01); *H01F 1/09* (2013.01); *B22F 2301/35* (2013.01); *B22F 2302/25* (2013.01); *B22F 2304/10* (2013.01); *C08K 2003/0856* (2013.01); *C08K 2201/005* (2013.01); *C08K 2201/01* (2013.01)

(56) References Cited

U.S. PATENT DOCUMENTS

| | | | |
|---|---|---|---|
| 4,917,947 A | 4/1990 | Kosha et al. | |
| 4,954,234 A * | 9/1990 | Thomassen | C25C 7/007 204/212 |
| 5,866,273 A | 2/1999 | Wiggins et al. | |
| 6,231,728 B1 * | 5/2001 | Metzger | C25D 5/617 204/240 |
| 6,486,822 B1 | 11/2002 | Peterman | |
| 2003/0215484 A1 * | 11/2003 | Axen | C04B 41/89 427/2.27 |
| 2008/0185554 A1 | 8/2008 | Ulicny et al. | |
| 2009/0214825 A1 | 8/2009 | Sun et al. | |
| 2010/0025253 A1 * | 2/2010 | Yoshioka | C25D 11/06 205/333 |
| 2010/0255310 A1 | 10/2010 | Chen et al. | |
| 2010/0307601 A1 | 12/2010 | Gabriel et al. | |
| 2013/0112912 A1 | 5/2013 | Wolfrum et al. | |
| 2013/0295461 A1 * | 11/2013 | Chen | H01M 4/80 429/223 |
| 2019/0292680 A1 * | 9/2019 | Kozak | B01J 39/05 |

FOREIGN PATENT DOCUMENTS

| | | |
|---|---|---|
| CN | 102610817 A | 7/2012 |
| CN | 106312049 A | 1/2017 |
| CN | 106715762 A | 5/2017 |
| JP | 2000344528 A | 12/2000 |
| JP | 2002053999 A | 2/2002 |
| WO | 0195347 A2 | 12/2001 |
| WO | 2016010541 A1 | 1/2016 |

OTHER PUBLICATIONS

Malecki P et al., "Influence of carbonyl iron particle coating with silica on the properties of magnetorheological elastomers," Smart Materials and Structures, IOP Publishing LTD., vol. 25, No. 10, dated Sep. 23, 2016, p. 105030 [Abstract Only].

Chinese Patent Office, First Office Action for Chinese Patent Application No. 202011213630.9, mailed Mar. 2, 2024.

Dehnavi et al., "Corrosion properties of plasma electrolytic oxidation coatings on an aluminium alloy—The effect of the PEO process stage," Materials Chemistry and Physics 161 (2015) 49-58.

European Patent Office Extended European Search Report for Application No. 20203670.3-1103 dated Apr. 1, 2021.

Shen R et al., "Synthesis and corrosion study of zirconia-coated carbonyl iron particles," Journal of Colloid and Interface Science, Academic Press Inc, US, vol. 342, No. 1, Feb. 1, 2010, pp. 49-56.

* cited by examiner

CERAMIC COATED IRON PARTICLES AND METHODS FOR MAKING CERAMIC COATED PARTICLES

CROSS-REFERENCE TO RELATED APPLICATIONS

The present disclosure is a divisional application of U.S. application Ser. No. 16/676,509 filed Nov. 7, 2019. The aforementioned patent application is hereby incoroporated by reference in its entirety.

FIELD

Aspects of the present disclosure provide ceramic coated iron particles, compositions including ceramic coated iron particles, components with compositions disposed thereon, and methods for making ceramic coated iron particles.

BACKGROUND

In recent years, significant attention has been paid to magnetic particles, and iron particles in particular, which are commonly used because of their excellent magnetic properties. They can be applied in various fields of technologies, in biomedical applications, absorption and catalyst processes or to produce magnetorheological fluids and composites. Depending on desired dimensions, the iron particles can be nano-, micro- or macroscopic in size.

Carbonyl iron particles, for example, are primary components for the design of magnetic type electromagnetic wave absorbers. Carbonyl iron is substantially pure iron (99.9% iron content or greater) formed from iron containing carbonyl moieties (e.g., $Fe(CO)_5$). Carbonyl iron powder (CIP), for example, has specific magnetic properties useful for many applications and can be a desirable additive for a coating due to these magnetic properties. However, carbonyl iron is susceptibile to oxidation and corrosion at high temperatures leading to a decrease in magnetic properties. Furthermore, uniform dispersion of CIP is a challenge and failure to have proper dispersion can impact CIP performance. For example, methods, such as coating the particle with a polymer, can cause agglomeration of the particles and dispersion of the particles can be hindered.

Silica iron, for example, has been used instead of carbonyl iron because it is less susceptible to corrosion and easier to process. Known passivation techniques for carbonyl iron or silica iron include: carbon dioxide passivation, electroless plating of cobalt, polyaniline passivation, microwave plasma processes, as well as silica coatings. These processes involve numerous/complex processing steps, result in substantial increases in the mass and volume of the particle, cause agglomeration of the resulting particles, and can diminish the particles' magnetic properties.

There is a need for new and improved iron particles with retained or improved magnetic properties and improved methods for coating iron particles.

SUMMARY

The present disclosure provides coated iron particles, or reaction product of the coating and iron particle, comprising an iron particle and a cermic coating disposed on the iron particle.

Aspects of the present disclosure provide a coated iron particle, or reaction product of the coating and iron particle, including an iron particle having a diameter of from about 0.5 micron to about 100 microns; and a ceramic coating disposed on the iron particle.

Aspects of the present disclosure further provide compositions comprising a coated iron particle and a polymer or adhesion promoter.

Aspects of the present disclosure further provide components, such as components, such as vehicle components, having a surface and a composition of the present disclosure disposed on the surface.

Aspects of the present disclosure further provide a method for disposing a ceramic coating on an iron particle including providing an alkaline electrolyte including water, a source of hydroxide ion, and one or more additional components selected from the group consisting of: water-soluble inorganic fluorides, water-soluble organic fluorides, water-dispersible inorganic fluorides, water-dispersible organic fluorides, and mixtures thereof. The method includes providing a cathode electrically connected to the electrolyte and introducing a plurality of iron containing particles to a barrel and the electrolyte. The method provides passing a current between the anode and cathode through the electrolyte solution while rotating the barrel for a time effective to form a first layer of ceramic coating disposed on the plurality of iron containing particles.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure relates to coated iron particles and compositions that provide iron particles that are not prone to corrosion and maintain their magnetic properties after electrolytic deposition. Methods of forming the coated iron particles of the present disclosure provide uniform ceramic coatings and simple processes with relatively inexpensive materials, all of which reduce manufacturing time and costs, as compared to conventional iron coating methods.

Coated Iron Particles

The present disclosure provides iron particles having a ceramic coating (also referred to as an "inorganic-based coating"). A ceramic coating can partially or completely coat the outer surface of an iron particle. An iron particle can be substantially pure iron. Compositions of the present disclosure can include the components of the composition and/or reaction product(s) of two or more components of the composition. Iron particles can include carbonyl iron particles or silica iron particles. In at least one aspect, a coated iron particle has a diameter of from about 0.5 microns to about 100 microns, such as from about 1 micron to about 100 microns, such as from about 1 micron to about 20 microns, such as from about 1 micron to about 5 microns, such as from about 1 micron to about 3 microns, for example about 1.2 microns. It has been discovered that large particles (e.g., greater than 100 microns) are difficult to disperse due to their weight and are difficult to spray coat the particles uniformly with a coating. Smaller particles are easier to disperse and easier to spray coat uniformly. An iron particle of the present disclosure can have an iron content of about 90 wt % or greater, such as about 95 wt % or greater, such as about 99 wt % or greater, such as about 99.9 wt % or greater. Iron particles can be obtained from commercial sources, such as BASF of Ludwigshafen, Germany.

In at least one aspect, a ceramic coating is disposed on an iron particle and has a thickness of from about 30 Angstroms to about 15,000 Angstroms, such as from about 100 Angstroms to about 1,000 Angstroms. In at least one aspect, a coated iron particle has a ceramic coating content of from about 0.01 volume percent (vol %) to about 30 vol %, such as from about 0.05 vol % to about 10 vol %, such as from about 0.1 vol % to about 1 vol %, for example about 0.5 vol %, based on the total volume of the ceramic coated iron particle, as determined by the difference in the weight and density of the particles before and after coating the particles. In at least one aspect, a coated iron particle has a ceramic coating content of from about 0.5 weight percent (wt %) to about 30 wt %, such as from about 1 wt % to about 10 wt %, such as from about 2 wt % to about 5 wt %, for example about 3 wt %, based on the total weight of the ceramic coated iron particle, as determined by the difference in the weight of the particles before and after coating the particles. As used herein, "ceramic coating content" of an iron particle is the percent by volume or weight of a coated iron particle that is ceramic coating.

Ceramic coatings of the present disclosure have no or negligible effect on the magnetic susceptibility of an iron particle, according to ASTM A596. In electromagnetism, the magnetic susceptibility (Latin: susceptibilis, "receptive"; denoted $X_s$) is one measure of the magnetic properties of a material. The susceptibility indicates whether a material is attracted into or repelled out of a magnetic field, which in turn can have implications for practical applications. As volume of the particle increases (for pure iron), $X_s$ increases. In a coating as the volume fraction increases, $X_s$ increases. So, if a core shell (core is iron and the shell is an electrolytic deposition layer), $X_s$ would decrease as the shell gets thicker. Also, if the particle corrodes, the core decreases in size and $X_s$ will decrease. Ceramic coatings of the present disclosure prevent or reduce corrosion of the iron particle both during production of the coating and during use of the coated particle.

In at least one aspect, a coated iron particle of the present disclosure has a diameter of from about 1 micron to about 5 microns and has a magnetic susceptibility of from about 3 $X_s$ to about 10 $X_s$. In at least one aspect, a coated iron particle of the present disclosure has a ratio of $X_s$ to particle diameter of from about 0.5:1 to about 1.5:1, such as about 0.7:1 to about 1.2:1, for example about 1:1. The ratio of $X_s$ to particle diameter illustrates that ceramic coatings of the present disclosure can provide no or negligible effects on magnetic susceptibility of an iron particle, which provides maintained dispersion ability of the coated particles. Coated iron particles and compositions of the present disclosure disperse equally well (e.g., do not agglomerate) as compared to nonelectrolytically deposited iron particles, unlike conventional coated iron particles, such as silica coated iron particles.

A ceramic coating provides corrosion resistance of the iron particle in addition to promoting dispersion of the coated particles when in composition with other iron particles, such as other coated iron particles, (the composition having coated particles that are coated with the same or different coating materials as other coated particles of the composition). Furthermore, ceramic coatings of the present disclosure can have a thickness suitable to provide adequate protection of the iron particles from corrosion, but are thin enough that the iron particle's magnetic properties are not substantially diminished, if at all. Ceramic coatings of the present disclosure can be self-assembled monolayers on the iron particle surface. Without being bound by theory, ceramic compound(s) of the ceramic coating can covalently bond to the iron particle surface. Accordingly, the ceramic coating is less likely to debond from the iron particle as compared to noncovalent coatings in a corrosive environment.

Ceramic coatings of the present disclosure can include and/or are the reaction product of one or more ceramic compounds.

A ceramic coating (inorganic-based coating) can be physically or chemically bonded to at least one iron surface of the iron particle and is a first layer including inorganic material. An inorganic-based coating may include some organic material, but contains a greater mass of inorganic material than mass of organic molecules. The inorganic material may act as a matrix in which any organic constituent may be distributed. For example, the inorganic-based coating may be applied by an electrolytic deposition process. In at least one aspect, the inorganic-based coating includes one or more of: chromium, titanium, nickel, fluorine, oxygen, cerium, silicon, or copper. In at least one aspect, the inorganic-based coating includes a metal oxide. Metals can be cerium, copper, or mixture(s) thereof.

In some embodiments, despite the absence of organic or other carbonaceous components added to the electrolyte, the inorganic-based coating may include carbon. Both the carbon and alloying elements, if present, may be dispersed in an insulating ceramic layer. Even with inclusion of carbon and alloying elements in the inorganic-based coating, a uniform thickness can be generated which provides uniform paint and adhesive bonding, reduced wear and chipping which improves corrosion resistance, and maintained magnetic properties. If the process is self limiting, the insulating ceramic that forms will have uniform thickness on the iron particle. Also, the barrel plating process ensures the particles have sufficient movement during the electrocoating process to reduce variability in coating thickness.

The inorganic-based coating can include chromium, titanium, nickel, cerium, silicon, or copper, which may be present in an amount independently from at least about 10, 12, 14, 16, 18, or 20 atomic % to about 45, 40, 35, 33, 30, 28, 26, 24 or 22 atomic % of the inorganic-based coating. The inorganic-based coating includes fluorine, which may be present from about 15, 20, 22, 24, 26, 28, 30, 32, 34, 36, or 38 atomic % to about 60, 55, 50, 45 or 40 atomic %. The inorganic-based coating can include oxygen, which may be present from about 3, 4, 5, 6, 7, 8, 9, 10, 12, 14, 16, 18, or 20 atomic % to about 33, 30, 28, 26, 24 or 22 atomic % of the inorganic-based coating.

The inorganic-based coating may include carbon, which may be present from about 3, 4, 5, 6, 7, 8, 9, 10 atomic % to about 33, 30, 28, 26, 14 or 12 atomic % of the inorganic-based coating, such as from about 1, 2, 3, 4, or 5 atomic % to about 14, 13, 12, 10, 8 or 6 atomic % of the inorganic-based coating.

The ratio of oxygen to fluorine in the inorganic-based coating may exhibit a gradient wherein amount of oxygen relative to amount of fluorine increases as a function of distance from the iron-containing particle's surface. In one embodiment, the ratio may range from about 0.1:1 to about 1:1. This ratio of ranges may provide additional corrosion protection.

The inorganic-based coating may have a bi-layer morphology. The inorganic-based coating can have a bilayer structure, despite being deposited in a single process: a first sub-layer can be disposed on an iron surface and have an interface with the iron surface (first interface); and a second sub-layer disposed on the first sub-layer and spaced away from the iron surface by the first sub-layer disposed there between. The second sub-layer can be bonded with the first sub-layer at an interface with the first sub-layer (second interface). The second sub-layer of the inorganic-based coating can have pores, internal surfaces, and external surfaces.

The external surfaces of the second sub-layer lie in a boundary between inorganic-based coating and an external environment or a secondary layer applied to the outer boundary and are not in direct contact with a iron surface of the coated particle. The first sub-layer can have few or no pores (e.g., dense) and has a more dense composition than the second sub-layer. Pores present in the first sub-layer might not be contiguous between the iron surface of the particle and the external surface of the inorganic-based coating layer, and optionally smaller than the pores of the second sub-layer. Pores can provide diffusion of a second coating into the first coating (e.g., pores of the first coating). Some of the pores of the second sub-layer are open pores in communication with the external surface. In some embodiments, the second sub-layer may include open and closed cell pore structure. Pore size may range from about 0.1 microns to 5 microns and may make up as much as 50% or more of the volume of the deposited coating.

Coating thickness of the inorganic-based electrolytically deposited coating may range from 0.1 microns to about 50 microns, such as from about 0.5 microns to about 5 microns. Coating thickness of the inorganic-based electrolytically deposited coating can be from about 0.1, 0.5, 1, 3, 5, 7, 9, 10 or 11 microns thick to about 50, 30, 15, 10, 7, 5, 3, or 2 microns thick. The thickness of the coating can provide sufficient corrosion protection without substantially inhibiting (if at all) the magnetic properties of the ceramic-coated particle.

In one embodiment, iron-containing particle may have a composite coating wherein the inorganic-based coating may act as a matrix. A matrix is a three dimensional structure configured to promote interaction of the inorganic-based coating with a second component (e.g., layer). For example, the matrix can promote physical adsorption of the second component because the inorganic-based coating contains pores. This embodiment can include a coating including:
  A) a matrix of a first layer of an inorganic-based coating disposed on an iron-containing surface, and
  B) a second component that is different from the inorganic-based coating and distributed throughout at least a portion of the matrix.

In at least one aspect, the coating on the iron-containing particle can include:
  A) a first layer of inorganic-based coating chemically bonded directly to a surface,
  B) a second component, e.g. a vanadium post-treatment, that is different from the inorganic-based coating and distributed throughout at least a portion of the inorganic-based coating and
  C) second layer that is different from the inorganic-based coating and is adhered to at least external surfaces of the inorganic-based coating.

In at least one aspect, the second component may have the same composition as the second layer. In another embodiment, the second component may be different from both A) and C). In at least one aspect, the second component and/or the second layer may form reaction products with elements in the inorganic-based coating. In at least one aspect, the inorganic-based coating has a layer of paint deposited thereon, which may include the second layer or may be in addition to the second layer.

In at least one aspect, inorganic-based coatings, and aqueous compositions for depositing the inorganic-based coatings may be substantially free from many ingredients used in conventional compositions for similar purposes. For example, aqueous compositions, when directly contacted with metal in a process of the present disclosure, may contain no more than 1.0, 0.5, 0.35, 0.10, 0.08, 0.04, 0.02, 0.01, 0.001, or 0.0002 wt %, of one or more (e.g., each) of the following constituents: chromium, cyanide, nitrite ions; organic materials, e.g. organic surfactants; amines, e.g. hydroxylamines; ammonia and ammonium cations; silicon, e.g. siloxanes, organosiloxanes, silanes, silicate; phosphorus; rare earth metals; sodium; sulfur, e.g. sulfate; permanganate; perchlorate; borate and/or free chloride. Inorganic-based coatings and inorganic secondary layers according to the present disclosure may contain no more than 1.0, 0.5, 0.35, 0.10, 0.08, 0.04, 0.02, 0.01, 0.001, or 0.0002 wt %, of one or more (e.g., each) of the following constituents: chromium, cyanide, nitrite ions; organic materials, e.g. organic surfactants; amines, e.g. hydroxylamines; ammonia and ammonium cations; silicon, e.g. siloxanes, organosiloxanes, silanes, silicate; phosphorus; rare earth metals; sodium; sulfur, e.g. sulfate; permanganate; perchlorate; borate and/or free chloride.

Inorganic-based coatings can be produced by a variety of processes capable of generating hard, amorphous coatings chemically bonded to metals. In one embodiment, the inorganic-based coating may be formed using electrolytic deposition according to the inventive process described herein.

Compositions and Coated Components

Ceramic coated iron particles of the present disclosure can be present in a composition. In at least one aspect, compositions of the present disclosure include a ceramic coated iron particle and one or more polymers or an adhesion promoter. In at least one aspect, a polymer includes at least one of a thermosetting polymer or a thermoplastic polymer. In at least one aspect, a polymer is at least one of an epoxy, a bismaleimide, a polyimide, a polyaryletherketone (such as a polyetheretherketone or a polyetherketone), a sol-gel, a polyurethane, a sealant, or a magneto rheological particle fluid. Sealants include silicones, polyurethanes, or epoxies. Magneto rheological particle fluids include particles dispersed in hydrocarbon oils, silicone oils, water phosphate ester fluids, or synthetic oils.

An adhesion promoter can be a sol-gel. A sol-gel can be Boegel®, such as 3M Surface Pre-Treatment AC-131 CB. 3% AC-131 kit can be obtained from 3M Corporation. 3% AC-131 is a non-chromate conversion coating and is typically disposed on aluminum, nickel, stainless steel, and titanium alloys. AC-131 has a Part A, which is an aqueous mixture of glacial acetic acid (GAA) and zirconium tetra-n-propoxide (TPOZ) and a Part B, which is (3-glycidyloxypropyl)trimethoxysilane (GTMS). The two components are mixed together (Part A+Part B) and the molar ratio of silicon to zirconium in the mixture is 2.77:1. A molar ratio of acetic acid to TPOZ in Part A is 0.45:1. The measured volumes of GAA and TPOZ can be mixed vigorously for about 10 minutes and then added to the Part A from the AC-131 kit. The premixed Part A solution can then be added to a measured volume of the Part B solution from the AC-131 kit and stirred followed by a 30 minute induction period. Coated iron particles of the present disclosure can be added to the Part A/Part B mixture before, during, or after the induction period. The composition can then be disposed on a surface, such as a surface of a component, such as a vehicle component.

Synthetic oils include: Group I: Conventional, non-synthetic oil. Made of fractionally distilled petroleum refined to improve certain performance categories like wax content and resistance to oxidation; Group II: Conventional, non-synthetic oil. Made of fractionally distilled petroleum that is further refined by hydrocracking (a hydrogen based treatment); Group III: Considered synthetic oil, but arguably has some significant similarities to conventional oil. Similar to Group II but with higher viscosity indices due to further hydrocracking refinement. Group IV: Synthetic oil. Comprised of polyalphaolefins (PAOs). Group V: This diverse group describes any base stocks that does not fit into any of the previous four groups.

Compositions of the present disclosure can have a coated iron particle content of from about 0.1 wt % to about 50 wt %, such as from about 0.5 wt % to about 10 wt %, such as from about 1 wt % to about 5 wt %, for example about 2 wt %. As used herein, "iron particle content" of a composition is the percent by weight of a composition that contains coated iron particles. An excess of coating can provide uniform coating of the iron particles and avoid insufficient coating which would otherwise promote agglomeration.

Compositions of the present disclosure can be disposed on a surface (such as a surface of a vehicle component). When disposed on a component, such as a vehicle component, a composition of the present disclosure provides a magnetic radar absorbing material capable of absorbing incident radio frequency radiation at a frequency of from about 30 MHz to about 300 Gz, such as about 300 MHz to about 30 GHz, such as about 3,000 MHz to about 3 GHz.

Compositions of the present disclosure can also be disposed on one or more surfaces of wind turbines, satellites, or other vehicles such as cars, boats, and the like.

Disposing a composition onto a surface can be performed by spraying, immersing, brushing, and/or wiping to form a composition layer. For example, suitable forms of spraying include spraying with a spray gun, high-volume, low-pressure spray gun, and/or hand pump sprayer. The solution is then cured (at room temperature or elevated temperature). In at least one aspect, a curing temperature is from about 10° C. to about 150° C., such as from about 20° C. to about 100° C., such as from about 30° C. to about 70° C., such as from about 40° C. to about 50° C. Curing can be performed for a time period of from about 15 minutes to about 72 hours. A cured composition layer of the present disclosure can have a thickness of from about 0.5 mil to about 500 mil, such as from about 5 mil to about 100 mil, such as from about 10 mil to about 50 mil, for example from about 1 mil to about 30 mil.

A vehicle component is a component of a vehicle, such as a structural component, such as landing gear(s), a panel, or joint, of an aircraft. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Figure 1:
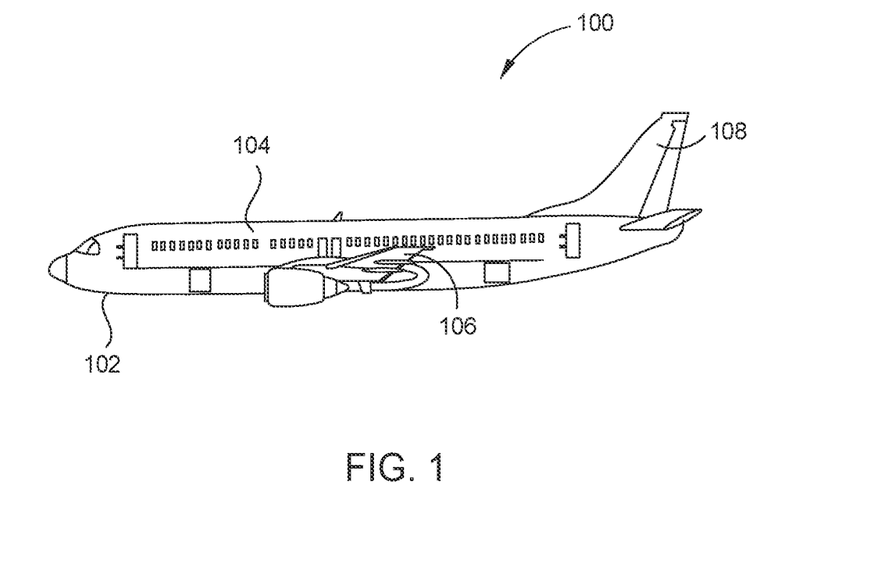
FIG. 1 is an aircraft comprising vehicle components, according to at least one aspect of the present disclosure.

FIG. 1 is an aircraft having vehicle components, according to at least one aspect of the present disclosure. As shown in FIG. 1, aircraft 100 includes an aircraft structure 102 including vehicle components such as an elongated body 104, a wing 106 extending laterally from the body 104, and a tail 108 extending longitudinally from the body 104. Compositions of the present disclosure can be disposed on one or more surfaces of these aircraft components to form one or more aircraft component(s) having a composition disposed thereon.

Other possible end uses of coated iron particles and/or compositions of the present disclosure can include incorporating the coated iron particles and/or composition into or onto magnetic tape (e.g., storage medium), motors (e.g., magnetic bearings), wind turbines (e.g., Doppler radar absorption to absorb the electromagnetic radiation), shielding for nuclear magnetic resonance spectroscopy machines (NMR) (e.g., magnetic coating), lining anechoic chambers (as a foam absorber), mu metal creating a change in magnetic field strength, and protecting computer chips from frequency exposure as an "RF blanket". Methods of the present disclosure can also inlude electrolytically depositing a ceramic coating onto copper particles (e.g., any small particles of metal that are susceptible to corrosion) for use in products, such as conductive inks.

Iron Particle Coating Processes

Figure 2:
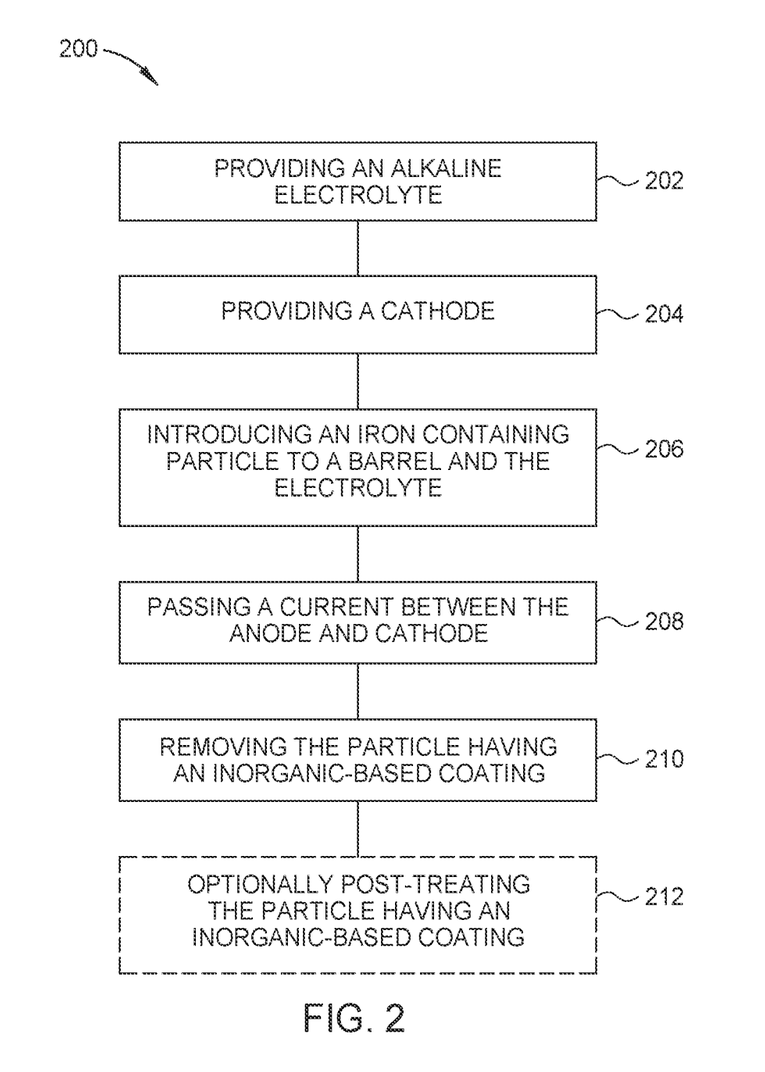
FIG. 2 is a flow diagram of a method for forming a ceramic-coated iron particle, according to at least one aspect of the present disclosure.

The present disclosure provides methods for forming a ceramic coated iron particle by coating the iron particle using electrolytic deposition. FIG. 2 is a method 200 for forming a ceramic coated iron particle. Method 200 includes:

providing 202 an alkaline electrolyte including water, a source of hydroxide ion, and one or more additional components selected from the group consisting of: water-soluble inorganic fluorides, water-soluble organic fluorides, water-dispersible inorganic fluorides, and water-dispersible organic fluorides and mixtures thereof;

providing 204 a cathode electrically connected to, e.g. in physical contact with, the electrolyte;

introducing 206 an iron containing particle to a barrel and the electrolyte. The iron containing particle can act as an anode;

passing 208 a current between the anode and cathode through the electrolyte solution while rotating the barrel (drum) for a time effective to form a first layer (e.g., a partial layer or a complete layer) of an inorganic-based coating disposed on the iron containing particle;

removing 210 the particle having the first layer of an inorganic-based coating from the electrolyte and optionally drying it (or sintering it); and/or optionally post-treating 212 the particle having the first layer of an inorganic-based coating by:
introducing the first layer of an inorganic-based coating to a second component that is different from the inorganic-based coating and/or contacting the particle having the first layer of an inorganic-based coating with a polymeric composition thereby forming a second layer having organic polymer chains and/or inorganic polymer chains.

Barrel

The plating barrel can have perforations in its walls, which admit electrolyte from a plating tank in which the barrel is immersed. The barrel is rotated about an axis by any suitable means so that the particles loosely confined in the drum are tumbled for plating. Plating current is supplied from a suitable direct current power source such as a battery to the electrodes in the tank, a lead being connected to an optional anode which is in the solution, and lead(s) being connected to cathodes which are on the drum and make electrical contact with the iron particles as the particles are tumbled. There are many types or styles of barrel-plating devices and aspects of the present disclosure may be used with any suitable barrel-plating device.

Before or during the plating of a batch of particles in an apparatus as above described, another batch of particles can be added to the same drum while keeping the two batches separated. This is accomplished by an auxiliary container, small enough to be inserted and loosely confined with the main batch of iron particles in the plating drum, but large enough or of such shape that it will not be confused with the particles already in the drum. The shape of the container can be spherical (a ball) because this configuration lends itself to uniformity in action regardless of its position in the barrel. Other shapes of containers might additionally or alternatively be used.

The walls of the container are porous so that the plating solution may freely pass through, and for this purpose a series of small holes are provided in the container walls. These holes are made large enough and of sufficient number so that the plating solution can reach the batch of iron particles in the container, but at the same time are small enough so that the iron particles do not fall out of or become stuck in the openings. In order to load and unload the container, devices can be provided for opening and closing the same, such as a threaded joint between one half of the container and the other half of the container.

The walls of the container may be made of metal to provide a conducting path to parts within. However, an insulating substance or dielectric not substantially affected by the plating current, the electrolyte, or the physical tumbling action can be used. Plastics may be used for the container walls.

When the walls of the container are made of electrical insulating material as above described, means are provided on the container itself to conduct the plating current from the batch of iron particles in the drum outside of the auxiliary container to the batch of iron particles within the container. This may take the form of a multiplicity of metallic electrodes, threaded through appropriate holes in the walls of the ball, with radially extending inner ends for contact with the iron particles and with enlarged protruding outer heads for contact with the batch of iron particles in the barrel.

Because of the random positions which the container can take with respect to the main load of iron particles within the barrel during a tumbling process, the heads of the electrodes and their inner extensions can be fixedly secured in substantially uniformly spaced relation to each other throughout the surface of the container. This is done so that, regardless of the position of the container, one or more of the electrodes can be in contact at the same time with both the main batch of iron particles in the drum and the smaller batch of iron particles in the container.

In use, the plating barrel is loaded in the usual way with a batch of iron particles to be plated, and a proper electrolyte solution is supplied to the tank. Plating current can be applied to the main electrodes. When it is desired to plate a small batch of other iron particles, an auxiliary container can be loaded with such other iron particles, the container is closed, and the loaded container is placed with the first batch of iron particles in the barrel. Plating of both batches will proceed as the barrel is rotated, the auxiliary container obtaining electrolyte solution through the holes and being supplied with plating current through electrodes from the cathodes of the barrel and from the batch of iron particles in contact with these cathodes. When plating is complete, the coated iron particles and the container can be removed from the plating tank, and the container may be readily identified and separated from the coated iron particles. Thereafter, the coated iron particles may be unloaded from the container without need of sorting, and processed or used in any suitable fashion. Naturally, there is no need to limit the procedure to a single auxiliary container, if more than one additional batch of iron particles is desired to be plated.

Electrolyte

Depending on the condition of the surface of the surface to be coated, the process may include optional steps of: cleaning, etching, deoxidizing and desmutting with or without intervening processes of rinsing with water. Where utilized, a rinse water may be counterflowed into a preceding bath. Prior to contacting the article with the electrolyte, a process of masking or closing off portions of the article to limit or prevent contact with the electrolyte may be performed. For example, masking may be applied to portions of the article where no coating is desired or may be applied to protect article components or surfaces that might be damaged by the electrolyte.

After removing the coated iron particles from the electrolyte, the inorganic-based coating is not physically or chemically removed or etched. For example, no more than 1000, 500, 100, 50, 10, 9, 8, 7, 6, 5, 4, 3, 2, 1 or 0.5 mg/m$^2$ of the inorganic-based coating is be removed from the iron particle.

The iron particle surfaces to be coated are contacted with an electrolyte, such as an aqueous electrolyte having dissolved fluoride ions and free of phosphorus. The electrolyte may have a pH of 10 or less, such as less than 10, 9, 8.5 or 8. At a pH of greater than 10, such as greater than 9, ferrous hydroxide would form. In carrying out electrolytic deposition, an electrolyte is employed which may be maintained at a temperature between about 5° C. and about 90° C., such as from about 20° to about 45° C. A iron particle surface is contacted with, such as immersed in, an aqueous electrolyte and electrolyzed as the anode in the circuit. One such process includes immersing at least a portion of the article in the electrolyte, which is preferably contained within a bath, tank or other such container. A second article that is cathodic relative to the anode is also placed in the electrolyte. Alternatively, the electrolyte is placed in a container (containing the barrel) which is itself cathodic relative to the iron particles (anode). Voltage is applied across the anode and cathode for a time sufficient to form an inorganic-based electrolytic coating on the iron particles. The time involved to produce a coating in an electrolytic process according to the present disclosure may be from about 30, 60, 90, 120 seconds to about 150, 180, 210, 240, 300 seconds. Electrolytic processing time can be varied to maximize efficiency by reducing time to Vmax and to control coating weight.

Alternating current, direct current or a combination may be used to apply the desired voltage, e.g. straight DC, pulsed DC, AC waveforms or combinations thereof. In at least one embodiment, pulsed DC current is used. For example, a period of about 0.1, 0.5, 1.0, 3.0, 5.0, 7.0, 9.0, or 10 millisecond to about 50, 45, 40, 35, 30, 25, 20, or 15 millisecond may be used, which period may be held constant or may be varied during the immersion period. Waveforms may be rectangular, including square; sinusoidal; triangular, sawtooth; or combination(s) thereof, such as by way of non-limiting example a modified rectangle having at least one vertical leg that is not perpendicular to the horizontal portion of the rectangular wave.

Peak voltage potential may be from about 140, 150, 160, 170, 180, 200, 300 volts to about 800, 700, 600, 500, 400 volts. In one aspect peak voltage can range from 120-200 volts.

Average voltage may be from about 50, 70, 90, 100, 120, 130, 140, or 150 volts to about 600, 550, 500, 450, 400, 350, 300, 250, 200 or 180 volts. In one embodiment, average voltage is from about 120-300 volts. In another embodiment, average voltage may be selected to be in a higher range of 310-500 volts.

Voltage is applied across the electrodes until a coating of the desired thickness is formed on the surface of the article. Generally, higher voltages result in increased overall coating thickness and sparking may ensue. Higher voltages may be used within the scope of the present disclosure provided that the iron particles are not damaged and coating formation is not negatively affected.

Additionally or alternatively, alternative oxide coatings can be disposed on a particle. Nickel oxide coatings can be formed using an electrolyte solution. For example, an electrolyte solution can include nickel sulfamate. Chromium oxide coatings can be formed using an electrolyte solution. For example, an electrolyte solution can include chromic acid. Other oxide coatings, which will not cause corrosion of the iron particle, include: titanium oxide coatings, cerium oxide coatings, silicon oxide coatings, and copper oxide coatings, each of which can be formed using an suitable electrolyte solution.

The electrolyte for the process may be an aqueous alkaline composition including a source of fluorine and a source of hydroxide ions. The source of hydroxide may be inorganic or organic, provided that it can be dissolved or dispersed in the aqueous electrolyte and does not interfere with the deposition of the inorganic-based coating.

Suitable examples include NaOH and KOH, with KOH being preferred. The source of fluoride may be inorganic or organic, provided that it can be dissolved or dispersed in the aqueous electrolyte and does not interfere with the deposition of the inorganic-based coating. Suitable examples include at least one of alkali metal fluorides, certain alkaline earth metal fluorides, and ammonium bifluoride. In one embodiment, the electrolyte may include KF and KOH. For example, free alkalinity is measured and maintained at approximately 10-25 ml titrant using the following alkalinity titration: Pipet 50 mls (volumetric pipet) of bath into a beaker and titrate with phenolphthalein indicator until a clear endpoint is reached using 0.10 M HCl titrant. The process alkalinity can be controlled to be at least about 7, 8, 9, 10, 11, 12, 13, or 14 ml and not more than 24, 23, 22, 21, 20, 19, 18, 17, 16 or 15 ml.

The above-described coating process provides improved energy efficiency by lower electrical consumption compared to PEO/MAO processes. The present process can involve less than 20%, 15% or 10% of the electricity consumption (in kWh) to apply an electroceramic coating equal in thickness to a PEO coating per unit surface area. In one embodiment, a process utilizes no more than about 10, 9, 8, 7, 6, 5, 4, 3, 2, 1.5, 1 kWh/m$^2$ and energy consumption may be as low as about 0.2, 0.3, 0.4, 0.5, 0.6, 0.7, 0.8, 0.9 kWh/m$^2$. The electroceramic coating process also has lower cooling requirements for the electrolyte compared to PEO/MAO, generally less than 20%, 15% or 10% cooling of the electrolyte needed, which is in part due to the lack of spark generation.

Prior to electrolytic coating, iron particle surfaces may be subjected to one or more of cleaning, etching, deoxidizing and desmutting processes, with or without rinsing, or surface activation. Cleaning may be alkaline cleaning and a cleaner may be used to etch the surfaces. A suitable cleaner for this purpose is Parco Cleaner 305, an alkaline cleaner commercially available from Henkel Corporation. Desirably, the iron-containing surfaces may be etched by, for example, from about 3, 5, 7, 10, or 15 g/m$^2$ to about 20, 25, 30, 35, 40, 45 or 50 g/m$^2$. Etching can be accomplished using commercially available etchants and/or deoxidizers for iron. Depending on the iron and cleanliness, a desmutting process may also be included in processing. Suitable desmutters include acids such as carboxylic acids, e.g. hydroxyacetic acid, alone or in combination with chelators and nitrates. If any of the above-described processes is utilized, the iron-containing surfaces can be rinsed to reduce introduction of the prior processes' chemical components into the electrolyte.

Surface activation may be performed using any suitable method. In at least one aspect, surface activation is performed by chemical activiation, e.g. by functionalizing the surface, with desrired reactive functional groups. Additionally or alternatively, surface activation is performed by activation in an acidic solution, such as an acid nickel chloride solution (e.g., a commercially available Nickel Strike Solution).

Additional processes may be used after deposition of the inorganic-based coating, such as rinsing with water, alkaline solutions, acid solutions, or combination(s) thereof. In some embodiments, a process may include processes of applying at least one post-treatment, which may be dispersed in the inorganic-based coating, may form reaction products therewith, and/or may form an additional layer, or combination(s) thereof. The additional layer may be an inorganic layer, an organic layer or a layer that includes inorganic and organic components. Advantageously, any post-treatments, including for example additional layers described herein, may be durably bound to the inorganic-based coating; while other removable layers for masking during manufacture or for shipping after coating may be applied.

Vanadium can be present in the post-treatment in various oxidation states such as III, IV, and V. Sources of vanadium ions in the post-treatment can include metallic V, organic and inorganic V-containing materials, for example V-containing minerals and compounds. Suitable compounds of V include by way of non-limiting example oxides, acids and their salts, and V-containing organic materials, e.g. vanadyl acetylacetonate, vanadyl 3-ethylacetylacetonate, vanadium (V) oxytrialkoxides, bis(cyclopentadienyl) vanadium(II), phenylalkoxylvanadium compounds, bis[{2-methyl-4-oxopyran-3-yl)oxy]-oxo-vanadium and the like. Many decavanadate salts have been characterized: $NH^{4+}$, $Ca_2\backslash Ba^{2+}$, $Sr^{2+}$, and group I decavanadate salts may be prepared by the acid-base reaction between $V_2O_5$ and the oxide, hydroxide, carbonate, or hydrogen carbonate of the desired positive ion. Suitable decavanadate post-treatments include: Vanadium acetyl acetonate, $(NH_4)_6[V_{10}O_2B]\cdot 6H_2O$, $K_6[V_{10}O_2B]\cdot 9H_2O$, $Ca_3[V_{10}O_2B]\cdot 16H_2O$, $K_2Mg2[V_{10}O_2B]\cdot 16H_2O$, and/or sodium ammonium decavanadate. Suitable vanadium containing compositions according to this disclosure comprise, consist essentially of, or preferably consist of, water and vanadate ions, particularly decavanadate ions. The concentration of vanadium atoms present in vanadate ions in the composition according to the present disclosure can be from about 0.0005, 0.001, 0.002, 0.004, 0.007, 0.012, 0.020, 0.030, 0.040, 0.050, 0.055, 0.060, 0.065, 0.068, 0.070, or 0.071 M to about 1.0, 0.5, 0.30, 0.20, 0.15, 0.12, 0.10, 0.090, 0.080, 0.077, 0.074, or 0.072 M. The temperature of such a post-treating composition, during contact with the inorganic-based coating on the iron containing article can be from about 30° C., 35° C., 40° C., 45° C., 48° C., 51° C., 53° C., 55° C., 56° C., 57° C., 58° C. or 59° C. to about 90° C., 80° C., 75° C., 72° C., 69° C., 67° C., 65° C., 63° C., 6° C. or 61° C. At 60° C., the time of contact between the vanadium containing composition and the inorganic-based coating on the article as described above is from about 0.5, 1.0, 2.0, 2.5, 3.0, 3.5, 4.0, 4.3, 4.6, or 4.9 min to about 60, 30, 15, 12, 10, 8, 7.0, 6.5, 6.0, 5.7, 5.4, or 5.1 min.

At least one vanadium containing composition can be introduced to the second sub-layer of inorganic-based coating, contacting at least the external surfaces and/or at least some of the internal surfaces thereof. The second component may include the vanadium containing composition and/or may include reaction products of the vanadium containing composition and elements of the inorganic-based coating. In one embodiment, the vanadium containing composition reacts with elements of the inorganic-based coating to thereby forms a second component, which is different from the inorganic-based coating at least in that the second component includes vanadium. The second component may form a thin film in contact with the external surfaces of the inorganic-based coating and lining at least a portion of the pores in the inorganic-based coating.

In some embodiments, the vanadium containing compositions may also contact internal surfaces of the inorganic-based coating and/or react with elements of the internal surfaces rendering the inorganic-based coating more resistant to corrosion producing agents reaching the iron containing surface. Vanadium may further infiltrate the inorganic-based coating such that vanadium is distributed throughout at least a portion of the inorganic-based coating. Analysis of inorganic-based coatings according to the present disclosure that have been contacted with a vanadium containing composition can show the presence of vanadium in the inorganic-based coating matrix. Depth of penetration of vanadium second components into the inorganic-based coating matrix may include up to 100, 90, 80, 70, 65, 60, 55 or 50% of total thickness of the porous second sub-layer of the inorganic-based coating, said total thickness being measured from the second interface to the external surface of the inorganic-based coating.

In some embodiments, the vanadium containing composition may be reactive with elements in the inorganic-based coating. Contacting the inorganic-based coating with a vanadium-containing composition provides improved corrosion resistance and does not cover up the pores in external surfaces of the inorganic-based coating. This is beneficial if a subsequent paint process is to be used because the pores provide anchoring sites for adhering paint to the surface.

Another post-treatment process which may be employed is depositing an additional layer including a polymer, which may be done using a thermosetting resin which may or may not react with the inorganic-based coating. Average thickness of the polymeric second layer, as measured from an external surface of the inorganic-based coating to an outer surface of the second layer, may be from about 0.1, 0.25, 0.5, 0.75, 1, 2, 3, 4, or 5 microns to about 14, 12, 10, 8 or 6 microns. In contrast, typical paint thicknesses are at least 25 microns thick. Use of either a thin polymeric layer, as described above, or a paint, generally covers the pores in the external surfaces of the inorganic-based coating, the pores (of a matrix) providing improved adhesion of the polymer or paint and resulting in a uniform surface.

Polymers forming the second layer may include organic polymer chains or inorganic polymer chains. Examples of polymers suitable for an additional layer include by way of non-limiting example, silicone, epoxy, phenolic, acrylic, polyurethane, polyester, and polyimide. In one aspect, organic polymers selected from epoxy, phenolic and polyimide are utilized. Polymers forming additional layers can include phenol-formaldehyde-based polymers and copolymers generated from, for example novolac resins, which have a formaldehyde to phenol molar ratio of less than one, and resole resins having a formaldehyde to phenol molar ratio of greater than one. Such polyphenol polymers can be made as is known in the art for example according to U.S. Pat. No. 5,891,952. Novolac resins can be used in combination with a crosslinking agent to facilitate curing. In one aspect, a resole resin having a formaldehyde to phenol molar ratio of about 1.5 is utilized to form a polymer additional layer on the inorganic-based coating.

Phenolic resins useful in forming polymeric layers can have molecular weights of about 1000 to about 5000 g/mole, preferably 2000 to 4000 g/mole.

An above-described resin can be introduced to the first layer of inorganic-based coating, contacting at least the external surfaces thereof, and crosslinking to thereby form a polymeric layer on external surfaces of the inorganic-based coating. This polymeric second layer is different from the inorganic-based coating and is adhered to the inorganic-based coating.

In some embodiments, the resin may also contact internal surfaces of the inorganic-based coating and upon curing form a polymeric second component that is different from the inorganic-based coating and distributed throughout at least a portion of the inorganic-based coating. Analysis of inorganic-based coatings according to the present disclosure that have been contacted with a resole resin having a formaldehyde to phenol molar ratio of 1.5 showed the polymeric components present in the inorganic-based coating matrix thereby forming a composite coating. Depth of penetration of polymeric second components into the inorganic-based coating matrix can be from about 1, 2, 5, 10, 15, 20 or 25% to about 70, 65, 60, 55 or 50%, 45, 40 or 35% of total thickness of the inorganic-based coating, said total thickness being measured from the first interface to the external surface of the inorganic-based coating.

In some embodiments, the resin may have functional groups reactive with elements in the inorganic-based coating, which may form bonds between the resin and the inorganic-based coating. For example, uncured novolac and resole resins have OH functional groups which may react with metals in the inorganic-based coating thereby linking the polymer to the inorganic-based coating.

Coated substrates according to the present disclosure are useful in motor vehicles; aircraft and electronics where the combination of the inorganic-based coating and post-treatment layers can provide more corrosion protection than paint or anodizing alone, while ceramic-type hardness of the combination imparts additional toughness to external layers because sharp objects have greater difficulty in deforming a harder substrate prime layer than iron, which is relatively soft as compared to ceramic.

ASPECTS

The present disclosure provides, among others, the following aspects, each of which may be considered as optionally including any alternate aspects.

Clause 1. A coated iron particle, or reaction product of a coating and the iron particle, comprising:
an iron particle having a diameter of from about 0.5 micron to about 100 microns; and
a ceramic coating disposed on the iron particle.

Clause 2. The coated iron particle of Clause 1, wherein the iron particle has a diameter of from about 20 microns to about 40 microns.

Clause 3. The coated iron particle of Clauses 1 or 2, wherein the iron particle has an iron content of about 99 wt % or greater.

Clause 4. The coated iron particle of any of Clauses 1 to 3, wherein the ceramic coating has a thickness of from about 0.5 microns to about 5 microns.

Clause 5. The coated iron particle of any of Clauses 1 to 4, wherein the coated iron particle has a ceramic coating content of from about 1 vol % to about 10 vol % based on the total volume of the ceramic coated iron particle, as determined by the difference in the weight and density of the particle before and after coating the particle.

Clause 6. The coated iron particle of any of Clauses 1 to 5, wherein the coated iron particle has a ceramic coating content of from about 1 wt % to about 10 wt % based on the total weight of the ceramic coated iron particle, as determined by the difference in the weight of the particle before and after coating the particle.

Clause 7. The coated iron particle of any of Clauses 1 to 6, wherein the coated iron particle has a ceramic coating content of from about 2 wt % to about 5 wt % based on the total weight of the ceramic coated iron particle, as determined by the difference in the weight of the particle before and after coating the particle.

Clause 8. The coated iron particle of any of Clauses 1 to 7, wherein the coated iron particle has a ratio of $X_s$ to particle diameter of from about 0.5:1 to about 1.5:1.

Clause 9. The coated iron particle of any of Clauses 1 to 8, wherein the ceramic coating comprises a metal oxide.

Clause 10. The coated iron particle of any of Clauses 1 to 9, wherein the ceramic coating is a substantially uniform coating (e.g., 10 microns or less, such as 5 microns or less, such as from about 1 micron to about 4 microns). To determine uniformity, the particle can be cross sectioned and imaged using SEM. To cross-section the particle, a very small volume of a plurality of the particles is added to an epoxy mounting resin, which is then cured and polished.

Clause 11. The coated iron particle of any of Clauses 1 to 10, wherein the metal oxide is copper oxide.

Clause 12. The coated iron particle of any of Clauses 1 to 11, wherein the ceramic coating comprises fluorine.

Clause 13. A composition, or reaction product of the coating and iron particle, comprising:
a coated iron particle of of any of Clauses 1 to 12; and
a polymer or an adhesion promoter.

Clause 14. The composition of Clause 13, wherein the composition comprises a polymer selected from an epoxy, a bismaleimide, a polyimide, a polyaryletherketone, a sol-gel, a polyurethane, a silicone, or a magneto rheological particle fluid.

Clause 15. The composition of Clauses 13 or 14, wherein the composition has a coated iron particle content of from about 0.5 wt % to about 10 wt %.

Clause 16. A component comprising a surface and the composition of of any of Clauses 13 to 15 disposed on the surface.

Clause 17. A method for disposing a ceramic coating on an iron particle comprising:
providing an alkaline electrolyte including water, a source of hydroxide ion, and one or more additional components selected from the group consisting of: water-soluble inorganic fluorides, water-soluble organic fluorides, water-dispersible inorganic fluorides, and water-dispersible organic fluorides and mixtures thereof;
providing a cathode electrically connected to the electrolyte;
introducing a plurality of iron containing particles to a barrel and the electrolyte; and
passing a current between the anode and cathode through the electrolyte solution while rotating the barrel for a time effective to form a first layer of ceramic coating disposed on the plurality of iron containing particles.

Clause 18. The method of Clause 17, further comprising removing the plurality of particles having the first layer of the ceramic coating from the electrolyte and optionally drying the plurality.

Clause 19. The method of Clauses 17 or 18, further comprising post-treating the plurality of particles having the first layer of the ceramic coating by:
introducing the first layer of the ceramic coating to a second component that is different from the ceramic coating and/or contacting the plurality of particles having the first layer of the ceramic coating with a polymeric composition thereby forming a second layer.

Clause 20. The method of any of Clauses 17 to 19, wherein the current is pulsed direct current having an average voltage of from about 50 volts to about 600 volts.

Clause 21. The method of any of Clauses 17 to 20, further comprising obtaining a plurality of coated iron particles, or reaction product thereof, the coated iron particles each comprising:
an iron particle having a diameter of from about 0.5 micron to about 100 microns; and
a ceramic coating disposed on the iron particle.

Clause 22. The method of any of Clauses 17 to 21, wherein the iron particle has a diameter of from about 20 microns to about 40 microns.

Clause 23. The method of any of Clauses 17 to 22, wherein the iron particle has an iron content of about 99 wt % or greater.

Clause 24. The method of any of Clauses 17 to 23, wherein the ceramic coating has a thickness of from about 0.5 microns to about 5 microns.

Clause 25. The method of any of Clauses 17 to 24, wherein the coated iron particle has a ceramic coating content of from about 1 vol % to about 10 vol % based on the total volume of the ceramic coated iron particle, as determined by the difference in the weight and density of the particle before and after coating the particle.

Clause 26. The method of any of Clauses 17 to 25, wherein the coated iron particle has a ceramic coating content of from about 1 wt % to about 10 wt % based on the total weight of the ceramic coated iron particle, as determined by the difference in the weight of the particle before and after coating the particle.

Clause 27. The method of any of Clauses 17 to 26, wherein the coated iron particle has a ceramic coating content of from about 2 wt % to about 5 wt % based on the total weight of the ceramic coated iron particle, as determined by the difference in the weight of the particle before and after coating the particle.

Clause 28. The method of any of Clauses 17 to 27, wherein the coated iron particle has a ratio of $X_s$ to particle diameter of from about 0.5:1 to about 1.5:1.

Clause 29. The method of any of Clauses 17 to 28, wherein the ceramic coating comprises a metal oxide.

Clause 30. The method of any of Clauses 17 to 29, wherein the ceramic coating is a substantially uniform coating (e.g., 10 microns or less, such as 5 microns or less, such as from about 1 micron to about 4 microns). To determine uniformity, the particle can be cross sectioned and imaged using SEM. To cross-section the particle, a very small volume of a plurality of the particles is added to an epoxy mounting resin, which is then cured and polished.

Clause 31. The method of any of Clauses 17 to 30, wherein the metal oxide is copper oxide.

Clause 32. The method of any of Clauses 17 to 31, wherein the ceramic coating comprises fluorine.

Clause 33. The coated iron particle, composition, or method of any of Clauses 1 to 32, wherein the ceramic coating has a surface roughness value of 5 microns or less (such as 4 microns or less, such as 3 microns or less, such as 2 microns or less), as determined by laser microscopy by imaging the particle and obtaining a profilometry scan to determine the surface roughness. Reduced surface roughness provides an increased uniformity of the coating which provides improved corrosion protection by the coating of the iron particle.

Overall, coated iron particles and compositions of the present disclosure provide iron particles that are not prone to corrosion and maintain their magnetic properties after coating deposition. Methods of forming the coated iron particles of the present disclosure provide uniform ceramic coatings and simple processes with relatively inexpensive materials, all of which reduce manufacturing time and costs, as compared to conventional iron coating methods.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A method for electrolytic deposition of a ceramic coating onto a plurality of iron particles comprising:
    providing an alkaline electrolyte solution to a plating tank having one or more electrodes, wherein the alkaline electrolyte solution comprises:
        water,
        a hydroxide ion source, and
        a fluorine source;
    introducing a plurality of iron particles to a plating barrel, the plurality of iron particles having diameters ranging from about 0.5 micron to about 100 micron;
    immersing the plating barrel in the plating tank, the plating barrel comprising one or more cathodes and one or more wall perforations;
    applying a current to the one or more cathodes for a time to deposit a ceramic coating layer over the plurality of iron particles; and
    removing the plurality of ceramic coated iron particles from the plating barrel;
    wherein the one or more wall perforations of the plating barrel are sized to provide containment of the plurality of iron particles and admit the alkaline electrolyte solution of the plating tank.

2. The method of claim 1, further comprising rotating the plating barrel about an axis to tumble the plurality of iron particles.

3. The method of claim 1, wherein the hydroxide ion source is selected from the group consisting of NaOH, KOH, and combinations thereof.

4. The method of claim 1, wherein the fluorine source is selected from the group consisting of a water-soluble inorganic fluoride, a water-soluble organic fluoride, a water-dispersible inorganic fluoride, a water-dispersible organic fluoride, and combinations thereof.

5. The method of claim 1, wherein the alkaline electrolyte solution has a pH of less than about 9.

6. The method of claim 1, wherein the alkaline electrolyte solution is maintained at a temperature of about 20° C. to about 45° C. during electrolytic deposition.

7. The method of claim 1, wherein the current is selected from the group consisting of a straight direct current, a pulsed direct current, an alternating current waveform, and combinations thereof.

8. The method of claim 7, wherein the current is an alternating current waveform, the alternating current waveform selected from the group consisting of a rectangular waveform, a square waveform, a sinusoidal waveform, a triangular waveform, a sawtooth waveform, and combinations thereof.

9. The method of claim 7, wherein the current is a pulsed direct current having an average voltage of about 50 volts to about 600 volts.

10. The method of claim 9, wherein the pulsed direct current has a peak voltage potential of about 140 volts to about 800 volts.

11. The method of claim 9, wherein the peak voltage potential of the pulsed direct current is applied to the cathode for a period of about 0.1 ms to about 50 ms.

12. The method of claim 1, wherein the ceramic coating layer is deposited over the plurality of iron particles for about 30 s to about 300 s.

13. The method of claim 1, further comprising post-treating the plurality of ceramic coated iron particles, wherein post-treating is selected from the group consisting of drying, sintering, deposition of additional ceramic layers, dispersion in inorganic-based coatings, deposition of a polymeric coating, and combinations thereof.

14. The method of claim 1, further comprising pre-treating the plurality of iron particles prior to introduction to the plating barrel, the pre-treatment comprising surface etching from about 3 g/m2 to about 50 g/m2.

15. A method for electrolytic deposition of a ceramic coating on a plurality of iron particles comprising:
    providing an alkaline electrolyte solution to a plating tank having one or more electrodes;

pre-treating a plurality of iron particles;
introducing the plurality of iron particles to a plating barrel, the plurality of iron particles having diameters from about 0.5 micron to about 100 micron, the plurality of iron particles comprising:
  a first fraction of iron particles confined within the plating barrel, and
  a second fraction of iron particles confined within an auxiliary containment unit, the auxiliary containment unit comprising porous walls with a plurality of metallic electrodes threaded throughout, the auxiliary containment unit being confined within the plating barrel;
immersing the plating barrel in the plating tank, the plating barrel comprising one or more cathodes and one or more wall perforations, the one or more cathodes being connected to one or more leads, the one or more leads being connected to the one or more electrodes of the plating tank, the one or more electrodes of the plating tank being connected to a power source;
applying a current to the one or more cathodes and the plurality of iron particles for a time to deposit a ceramic coating layer over the plurality of iron particles to form a plurality of ceramic coated iron particles, wherein
  the first fraction of iron particles are in electrical contact with the one or more cathodes of the plating barrel and the plurality of metallic electrodes of the auxiliary unit, and
  the plurality of metallic electrodes of the auxiliary unit are in electrical contact with the second fraction of iron particles;
removing the plurality of ceramic coated iron particles from the plating barrel and separating the first fraction of iron particles from the auxiliary containment unit; and
removing the second fraction of iron particles from the auxiliary containment unit.

16. The method of claim 15, wherein the pre-treating is selected from the group consisting of cleaning, etching, deoxidizing, desmutting, and combinations thereof.

17. The method of claim 15, wherein the auxiliary containment unit has a spherical shape.

18. The method of claim 15, wherein the porous walls of the auxiliary unit comprise pores smaller than the perforations of the plating barrel and large enough to admit the alkaline electrolyte solution.

19. The method of claim 15, wherein the first fraction of iron particles comprises a first size and a first chemical composition, and the second fraction of iron particles comprises a second size different than the first size and a second chemical composition different than the first chemical composition.

20. The method of claim 15, further comprising:
post-treating the plurality of ceramic coated iron particles by contacting the plurality of ceramic coated iron particles with a polymeric composition thereby forming a polymeric layer over the ceramic coating layer on the plurality of iron particles.

* * * * *